United States Patent
Sainath et al.

(10) Patent No.: US 11,186,310 B2
(45) Date of Patent: Nov. 30, 2021

(54) FREQUENCY TRACKING BASED FRICTION DETECTION USING ACCELEROMETER

(71) Applicant: STEERING SOLUTIONS IP HOLDING CORPORATION, Saginaw, MI (US)

(72) Inventors: Bhuvanesh Sainath, Saginaw, MI (US); Rangarajan Ramanujam, Saginaw, MI (US); Anthony Champagne, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 73 days.

(21) Appl. No.: 16/185,792

(22) Filed: Nov. 9, 2018

(65) Prior Publication Data
US 2020/0148253 A1 May 14, 2020

(51) Int. Cl.
*B62D 5/04* (2006.01)

(52) U.S. Cl.
CPC ......... *B62D 5/0463* (2013.01); *B62D 5/0481* (2013.01)

(58) Field of Classification Search
CPC .............................. B62D 5/0463; B62D 5/0481
USPC ........................................................... 701/42
See application file for complete search history.

(56) References Cited

U.S. PATENT DOCUMENTS

| 9,085,316 B2 | 7/2015 | Yang et al. | |
|---|---|---|---|
| 2014/0277945 A1* | 9/2014 | Chandy | B62D 15/025 701/42 |
| 2018/0237056 A1* | 8/2018 | Bremkens | B62D 5/0463 |

* cited by examiner

*Primary Examiner* — Brian P Sweeney
(74) *Attorney, Agent, or Firm* — Dickinson Wright PLLC

(57) ABSTRACT

According to the technical solutions described herein, an example method for frequency tracking based friction detection includes receiving, by a filter module, an accelerometer signal from an accelerometer coupled with an assist torque system. The method further includes estimating, by the filter module, harmonic content in the accelerometer signal based on an order frequency of the assist torque system. The method further includes in response to the harmonic content that is detected being greater than or equal to a predetermined threshold, initiating a friction estimation in the assist torque system. The method further includes adjusting an amount of torque being generated by the assist torque system based on an estimated friction in the assist torque system.

17 Claims, 9 Drawing Sheets

US 11,186,310 B2

FREQUENCY TRACKING BASED FRICTION DETECTION USING ACCELEROMETER

BACKGROUND

A typical motion control system employs at least one electric actuator, which is a control system utilizing electrical machines and complementary power electronic modules that are controlled via digital signal processors for determining the compensation logic and driving the hardware circuitry. The hardware components that are used in the control system has to be considered in the control system design to obtain optimal performance. The mechanical hardware involved in the control system are subject to multiple changes such as physical damages, changing environmental conditions, foreign particles intrusion, moisture incursion, etc. Robustness is generally built into the control system to account for nominal variation in the mechanical hardware setup and to ensure substantially consistent level of performance.

SUMMARY

According to the technical solutions described herein, an example method for frequency tracking based friction detection includes receiving, by a filter module, an accelerometer signal from an accelerometer coupled with an assist torque system. The method further includes estimating, by the filter module, harmonic content in the accelerometer signal based on an order frequency of the assist torque system. The method further includes in response to the harmonic content that is detected being greater than or equal to a predetermined threshold, initiating a friction estimation in the assist torque system. The method further includes adjusting an amount of torque being generated by the assist torque system based on an estimated friction in the assist torque system.

According to one or more examples, a system includes a motor, an accelerometer coupled to an assist torque system, and a motor control system operating the motor and performing a frequency tracking based friction detection using the accelerometer. The friction detection is performed using a method that includes estimating, by the filter module, harmonic content in the accelerometer signal based on an order frequency of the assist torque system. The method further includes in response to the harmonic content that is detected being greater than or equal to a predetermined threshold, initiating a friction estimation in the assist torque system. The method further includes adjusting an amount of torque being generated by the assist torque system based on an estimated friction in the assist torque system.

According to one or more examples, a friction detection system includes an accelerometer coupled to an assist torque system, and a controller coupled with the accelerometer. The controller performs a frequency tracking based friction detection that includes estimating, using a filter module, harmonic content in an accelerometer signal from the accelerometer based on an order frequency of the assist torque system. The method further includes in response to the harmonic content that is detected being greater than or equal to a predetermined threshold, initiating a friction estimation in the assist torque system. The method further includes adjusting an amount of torque being generated by the assist torque system based on an estimated friction in the assist torque system.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1A:
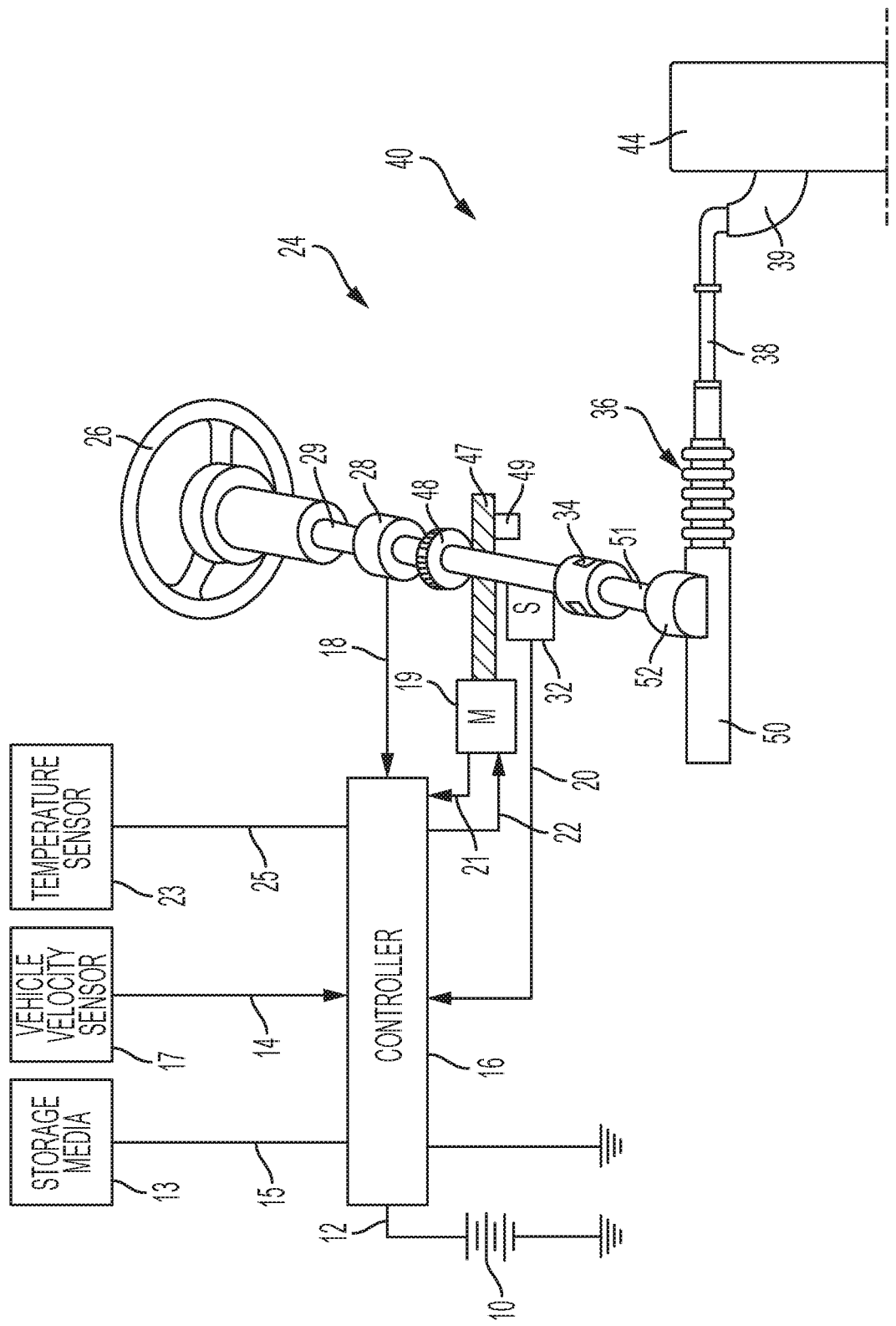
FIG. 1A is an exemplary embodiment of an electric power steering system according to one or more embodiments.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

As described herein, in a motion control system, the mechanical hardware involved in a typical motor control system are subject to multiple changes such as physical damages, changing environmental conditions, foreign particles intrusion, moisture incursion, etc. Robustness is generally built into the control system to account for nominal variation in the mechanical hardware setup and to ensure substantially consistent level of performance. If the variation in the state of the hardware is beyond an acceptable level, the control system can fail to provide an acceptable performance level and in some cases, can lead to extremely high efforts and/or the motion control system not being controllable.

For example, in the case of an electric power steering system (EPS) that is used in a vehicle, friction is one such critical factor that can be affected by changes in the mechanical hardware of the EPS. Friction is susceptible to variations due to several external factors such as ambient temperature, water intrusion into cut boot, etc. When the friction in the EPS mechanical component increases beyond an acceptable level, which is a predetermined threshold, the overall driver efforts increase, and this might lead to loss of drivability/controllability of the vehicle.

It should be noted that the various technical features described herein facilitate improvements to motor control systems. The description herein uses an EPS as an example that uses a motor control system, which is improved using and/or implementing the various technical features described herein. However, the technical solutions described herein are not limited to electric power steering systems, rather are applicable in motor control systems used in any other system, such as an industrial motor, a biomechanical device, an automated drive assist system, or any other electric machine that uses a motor control system.

Referring to the detection of friction, and more particularly, increase in friction between mechanical components in a motion control system like the EPS, present techniques for estimating friction are based on available signals from the motion control system. For example, in case of the EPS, the signals used include handwheel torque, motor angle, motor velocity, and motor torque command. Such estimations can provide an estimate of friction, however, the estimation represents total friction from multiple sources, such as steering assist mechanism, front steering linkage friction, kingpin axis friction, etc. A technical challenge exists to determine specific steering assist mechanism friction. Detecting such friction and/or change in friction between specific components such as the steering assist component can facilitate more targeted repairs, if necessary.

The one or more embodiments of the technical solutions described herein address such technical challenges and facilitate detecting increased friction levels within the steering control system with the help of an accelerometer. The friction can increase due to any reason such as foreign particle, salt water intrusion, and the like. The technical solutions further provide the appropriate compensation to maintain consistent driver efforts in a system with increased friction. The technical solutions described herein thus improve the performance of motion control systems, such as an EPS, by substantially increasing friction detection capability and alerting the driver before the EPS gets to an uncontrollable state. The technical solutions, thus, not only improve the functionality of the EPS, but also improve the safety of the driver. One or more embodiments of the technical solutions described herein also compensate for increased handwheel efforts through increased request of motor torque to drive the EPS.

Referring now to the Figures, where the technical solutions will be described with reference to specific embodiments, without limiting same, FIG. 1A is an exemplary embodiment of an electric power steering system (EPS) 40 suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g. a hand wheel and the like) is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 19, which includes a permanent magnet synchronous motor, and is hereinafter denoted as motor 19. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position θ as measured by a position sensor 32 over a prescribed time interval. For example, motor velocity $\omega_m$ may be determined as the derivative of the motor position θ from the equation $$\omega_m = \frac{\Delta\theta}{\Delta t}$$

where Δt is the sampling time and Δθ is the change in position during the sampling interval. Alternatively, motor velocity may be derived from motor position as the time rate of change of position. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 19, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 19. Controller 16 is configured to develop the corresponding voltage(s) out of inverter (not shown), which may optionally be incorporated with controller 16 and will be referred to herein as controller 16, such that, when applied to the motor 19, the desired torque or position is generated. In one or more examples, the controller 24 operates in a feedback control mode, as a current regulator, to generate the command 22. Alternatively, in one or more examples, the controller 24 operates in a feedforward control mode to generate the command 22. Because these voltages are related to the position and speed of the motor 19 and the desired torque, the position and/or speed of the rotor and the torque applied by an operator are determined. A position encoder is connected to the steering shaft 51 to detect the angular position θ. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 19.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 located at the electric machine 19. Preferably, the temperature sensor 23 is configured to directly measure the temperature of the sensing portion of the motor 19. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor velocity value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

The existing techniques for compensating for increased friction in the EPS use an estimate of instantaneous total effort at low handwheel rate on center inputs to determine the effort required to move the handwheel 14. By comparing this estimated effort to a base/nominal expected effort level, the existing techniques can provide a compensation to account for the delta effort (difference between estimated effort and expected effort) due to increased friction levels. The existing techniques use learning constraints that are configured to work in a particular configuration of the EPS, such as at highway vehicle speeds and on-center handwheel inputs. The existing technique is not found to be effective at learning increased effort levels during off-center and high handwheel rate inputs, for example when operating the vehicle at reduced vehicle speed (below a predetermined threshold) for example, in a parking lot, and the like.

Figure 1B:
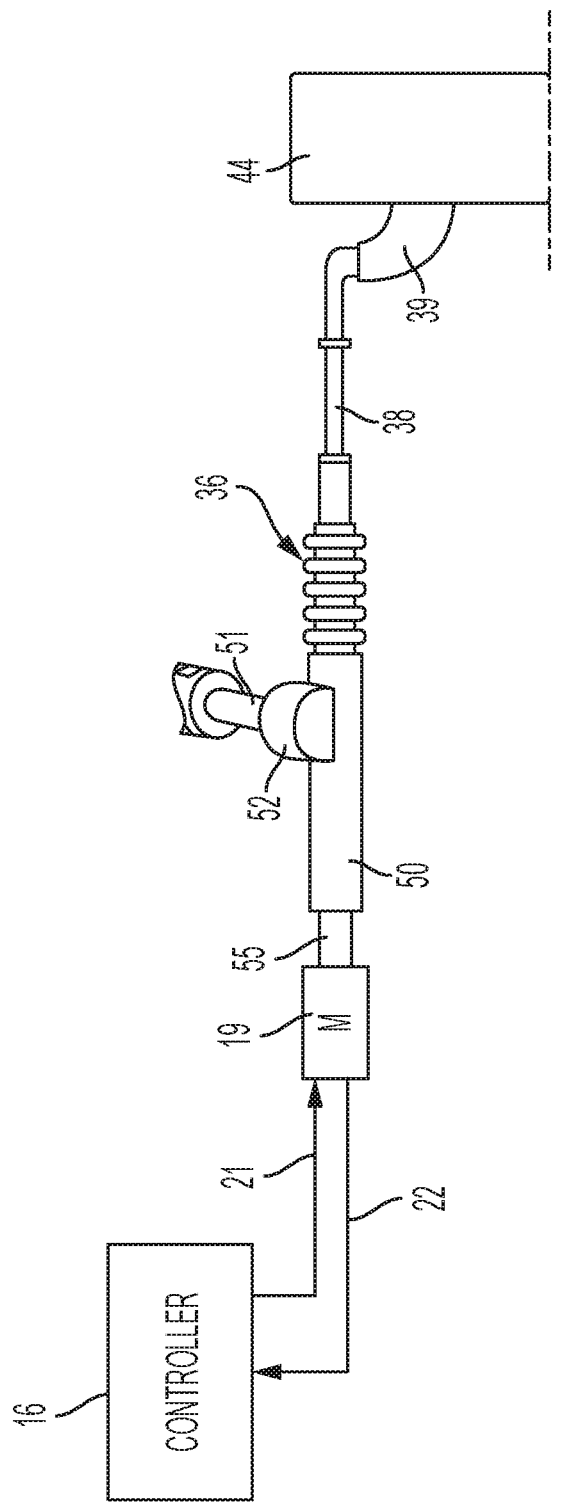
FIG. 1B is partial view of an electric power steering system according to one or more embodiments.

The technical solutions described herein use an accelerometer 49, mounted so as to be rigidly connected to the steering assist mechanism housing components (worm 47 in column EPS system of FIG. 1A) to sense vibration caused by, for example, a rusty ball nut or any other reason. It should be noted that the accelerometer 49 may be mounted at a different position than the depicted example, which is more for explanation purposes herein. FIG. 1B depicts a partial view of the steering system 40 in which the accelerometer 49 is shown to measure acceleration of a ballnut assembly 55, the EPS system 40 being a rack EPS system. It should be noted that FIG. 1A and FIG. 1B are for explanation purposes and that the position of the accelerometer 49 is for illustration; in one or more examples, the position of the accelerometer can be different than what is depicted. For example, the accelerometer 49 can be part of a system on chip (SoC) of the controller 16 itself, with the accelerometer 49 configured to measure the accelerometer of a particular mechanical component in the steering system 40, such as the worm-gear assembly in a column EPS, and the ballnut assembly 55 in the rack EPS.

The technical solutions described herein capture the variation in the internal vibration of the steering assist components between a normal (non-rusted) and rusted components. Further, in one or more examples, the technical solutions described herein use a detection scheme to complement the learning conditions of the existing techniques. The friction detection can be carried out at any vehicle speed, including the parking lot speeds that are below the predetermined speed threshold, and corresponding torque compensation (torque assist) can be provided. In one or more examples, a combined friction detection strategy can be applied to provide compensation for increased friction across a broader set of operating points, for example, the existing techniques for higher vehicle speeds (above the predetermined threshold speed) and the technical solutions described herein for lower vehicle speeds (equal to or less than the predetermined threshold speed).

For describing one or more embodiments, the ballnut assembly 55 is used as example, however it is understood that the features described herein are applicable to be used with any other mechanical component that is to be observed, such as a wormgear assembly 47.

Figure 2:
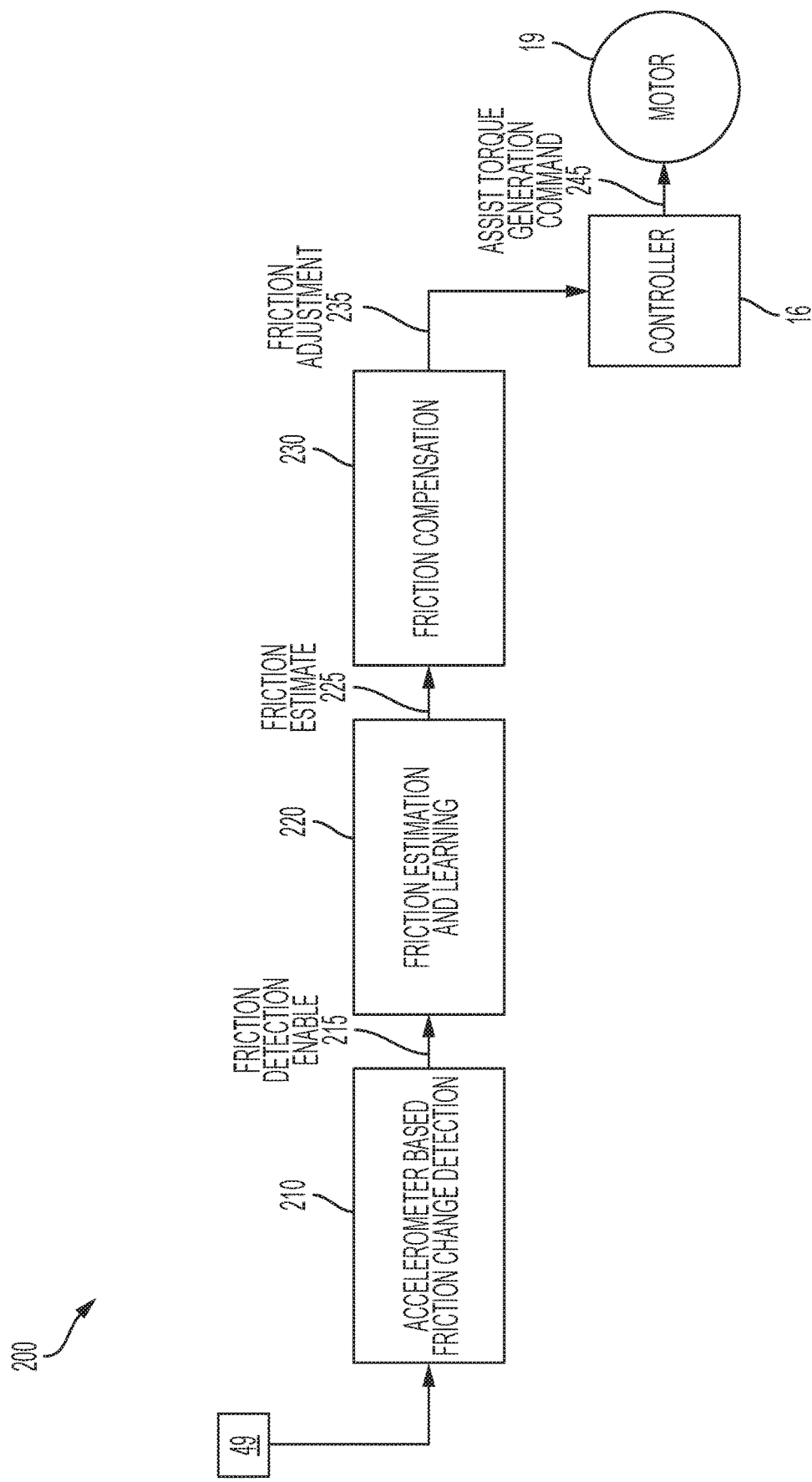
FIG. 2 depicts an accelerometer based friction detection system according to one or more embodiments.

FIG. 2 depicts an accelerometer based friction detection system 200 according to one or more embodiments. The accelerometer based friction detection system 200 includes the accelerometer 49, an accelerometer based friction change detector 210, a friction estimation and learning module 220, and a friction compensation module 230 among other components. The accelerometer based friction change detector 210 can be a hardware unit including electronic circuitry that is coupled with the accelerometer 49 and the controller 16. Alternatively, or in addition, the accelerometer based friction change detector 210 is part of the controller 16. In one or more examples, the accelerometer based friction change detector 210 includes a memory storage device that includes one or more computer executable instructions that are executable by a processing unit, such as the controller 16 to perform the friction estimation as described herein.

The friction estimation and learning module 220 determines an amount of friction in the EPS 12 using known existing techniques. In one or more examples, the EPS signal based friction detection module 110 includes a learning module that receives one or more input signals from the one or more sensors of the EPS 12 (except the accelerometer 49). For example, the input signals include a hand wheel angle, a hand wheel velocity, a hand wheel torque, a motor torque, a lateral acceleration, a vehicle speed, and one or more learning constraints. In one or more examples, the friction estimation and learning module 220 determines a friction estimate 225. The friction estimate 225 is used by a friction compensation module 230 to determine an adjustment 235 to be made to an assist torque that is being generated by the EPS 12. The friction compensation module 230 sends the friction adjustment 235 to the controller 16 that provides motor control of the motor 19. The controller 16 modifies the assist torque generation command 245 (voltage command, current command) that is applied to the motor 19 according to the friction adjustment 235. The motor 19 in turn generates the corresponding amount of assist torque for the driver to maneuver the vehicle 10.

The accelerometer based friction change detector 210 enables/disables the friction learning and estimation as described herein. The accelerometer based friction change detector 210 generates a high-friction detected 215 signal that is input to the friction estimation and learning module 220. If the high-friction detected 215 signal is disabled, the friction estimation and learning module 220 continues operating The accelerometer based friction change detector 210 detects a change in the friction in the assist torque components of the EPS 12 by tracking the ballnut bearing orders of the rusted/damaged ballnut bearing due to increased friction. The ballnut bearing driven by the motor 19 through a pulley and a belt transmits motion to the rack that connects the EPS 12 to the road wheels of the vehicle 10. The ballnut bearing is typically the most critical part that gets rusted in the EPS 12. It should be noted that similar to using the ballnut in case of a rack EPS system, one or more embodiments of the present invention can be tuned to selectively identify targeted frequency corresponding to critical parts for a column or pinion EPS systems. The one or more embodiments of the technical solutions described herein detect defects associated with rotating components, such as bearings, worm/wormgear and other such components. For these cases, the technical solutions facilitate detecting order-based defects. In order-based defects, the frequency of the resulting disturbance varies with the component's rotation speed (e.g. RPM), and/or angular velocity.

Acceleration levels captured in the EPS, by the accelerometer 49, are filtered using different techniques to follow the bearing orders of the ballnut and accordingly, the energy level facilitates capturing the vibration with respect to the order at a particular point of time. As rust starts to develop, the increased friction manifests itself as growing energy levels corresponding to order frequencies of the ballnut.

The accelerometer based friction change detector 210 extracts the energy content using different techniques. In one or more examples, the energy content is extracted using a moving bandpass filter with respect to a ballnut speed correlating to the order of bearing defects. Alternatively, in one or more examples, an LMS based correlation technique is used to track the amplitude of disturbances at targeted motor ballnut speed or motor ballnut position. Here, the ballnut order is indicator of a ballnut defect. Typically, the ballnut and the motor have a predetermined ratio, which dictates a relationship between a number of rotations of the motor 19 and a corresponding number of rotations of the ballnut assembly 55; the relationship is referred to as 'order'. A defect in the ballnut assembly 55 (or any other mechanical component that has such a relationship with the motor 19) can be identified based on the order, for example if a number of rotations of the ballnut assembly 55 do not match the predetermined order. In one or more examples, an inner race and an outer race of the ballnut assembly 55 can have different orders, for example an $18^{th}$ order on the inner race and a $22^{nd}$ order for the outer race.

Accordingly, the defect in the ballnut assembly 55 can be identified if the ballnut assembly 55 exhibits a different order than a predetermined ballnut order. The ballnut order needs to be adjusted because the ballnut velocity is not measured, instead the motor velocity is measured. Thus, the ballnut order needs to be adjusted by the belt/pulley ratio.

Figure 3:
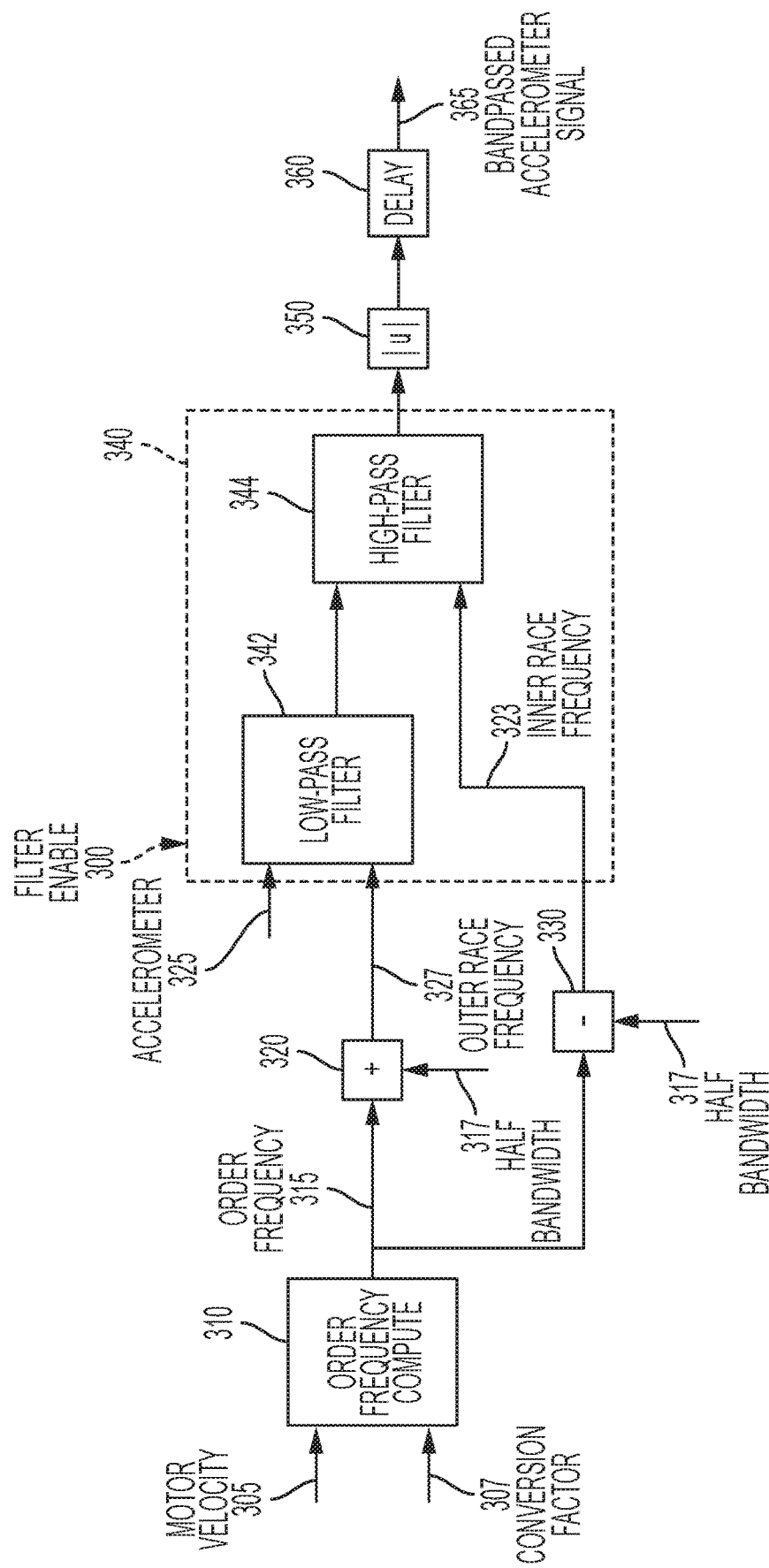
FIG. 3 depicts a block diagram depicting an operational flow for the accelerometer based friction change detector to extract the energy content in the accelerometer signal using a moving bandpass filter according to one or more embodiments.

FIG. 3 depicts a block diagram depicting an operational flow for the accelerometer based friction change detector 210 to extract the energy content in the accelerometer signal using a moving bandpass filter according to one or more embodiments. In this case, time domain accelerometer data 325 available in real time is processed through a moving bandpass filter 340 with center frequency aligning to that of the inner race and outer race of the ballnut bearing order. This is because the defect that causes the increase in friction affects the energy levels of the inner race frequency 323 and the outer race frequency 327 corresponding to the defect order.

Accordingly, order frequency 315 is included in analysis of the accelerometer data 325. This is done by computing (310) the order frequency 315 based on a motor velocity signal 305. The motor velocity is converted to the order frequency using a conversion factor 307. The conversion factor 307 can be computed dynamically, in one or more examples, or alternatively, is a calibrated value. In one or more examples, the first and second harmonics of the orders associated with the inner race and the outer race are also included for analysis. for example, if the inner race and the outer race of the ballnut assembly 55 are $9^{th}$ order and $11^{th}$ order respectively, the analysis will also include $18^{th}$ and the $22^{nd}$ orders (second harmonics)

The order frequency 315 is added (320) with a half bandwidth value 317 to compute the outer race frequency 327. The outer race frequency 327 is used as maximum value to perform a low-pass filter (342) of the accelerometer signal 325. Further, the half bandwidth value is subtracted (330) from the order frequency 315 to compute the inner race frequency 323. The inner race frequency 323 is used as a minimum value to perform a high-pass filter (344) of the low-pass filtered accelerometer signal. An absolute value (350) of the output of the high-pass filter 344 can be further delayed (360) to be used as a bandpassed accelerometer signal 365.

Figure 4:
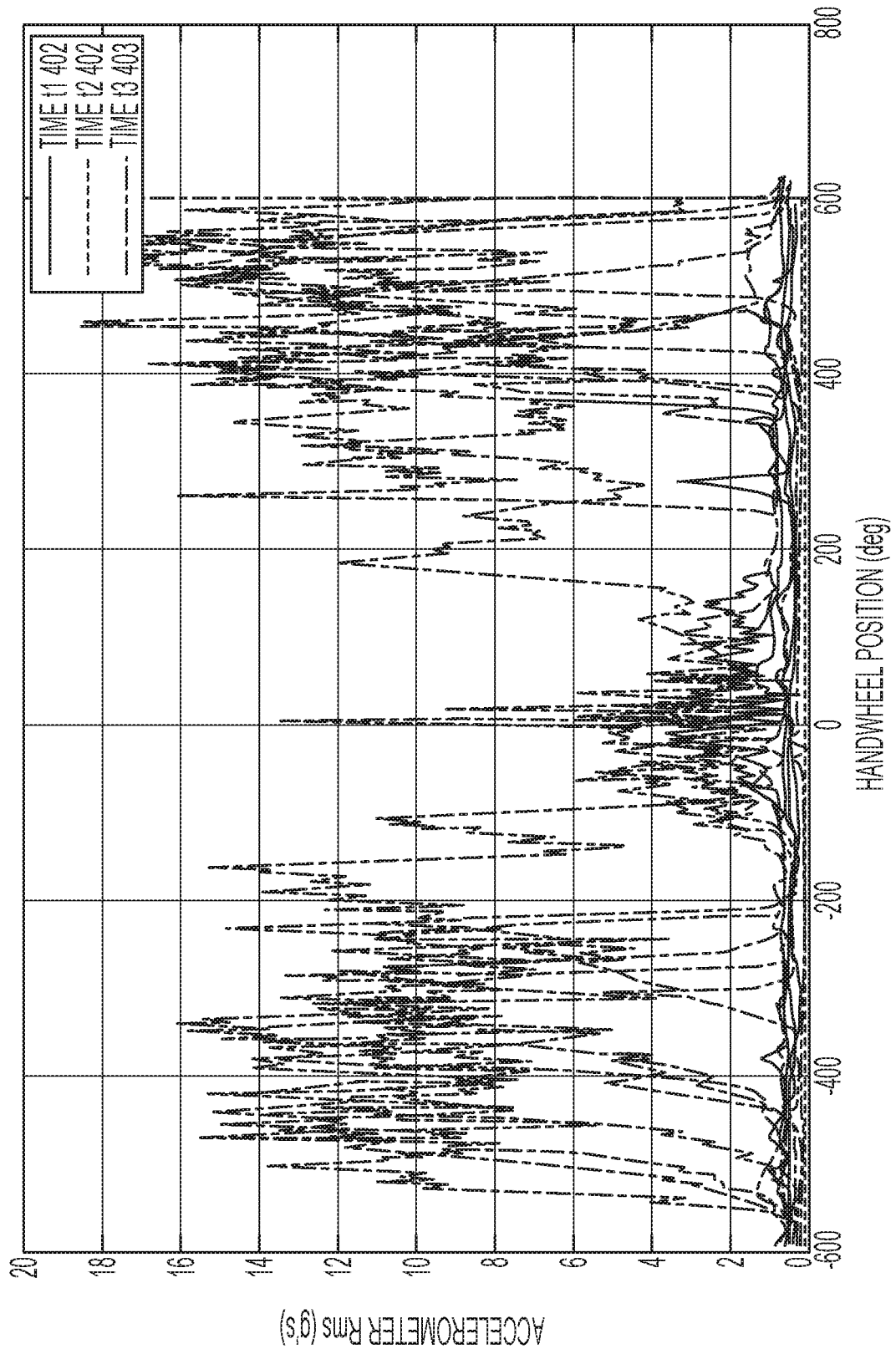
FIG. 4 depicts graphs that show the bandpassed accelerometer signal plotted against handwheel absolute position according to one or more embodiments.

The bandpassed accelerometer signal 365 when plotted against absolute handwheel position provides distinguishing information to differentiate between non-friction and friction gear. FIG. 4 depicts graphs that show the bandpassed accelerometer signal 365 plotted against handwheel absolute position with the data being recorded for a constant radius maneuver at a pre-defined vehicle speed over a duration of time. Plot-1 401, plot-2 402, and plot-3 403 depict the data collected at time t1, time t2, and time t3, in that chronological order, respectively. The data depicted in the plots is collected during a longitudinal study, and can be collected on different days, in multiple weeks, months and so on, to allow the mechanical component to develop and exhibit a defect, such as rust for example. In other cases, if the defect study can be accelerated, the data can be collected at a faster rate. The frequency/period associated with the data collection does not affect the technical solutions described herein. It should be noted that the graphs in FIG. 4 are for an example scenario and that the graphs will be different for different examples.

Figure 5:
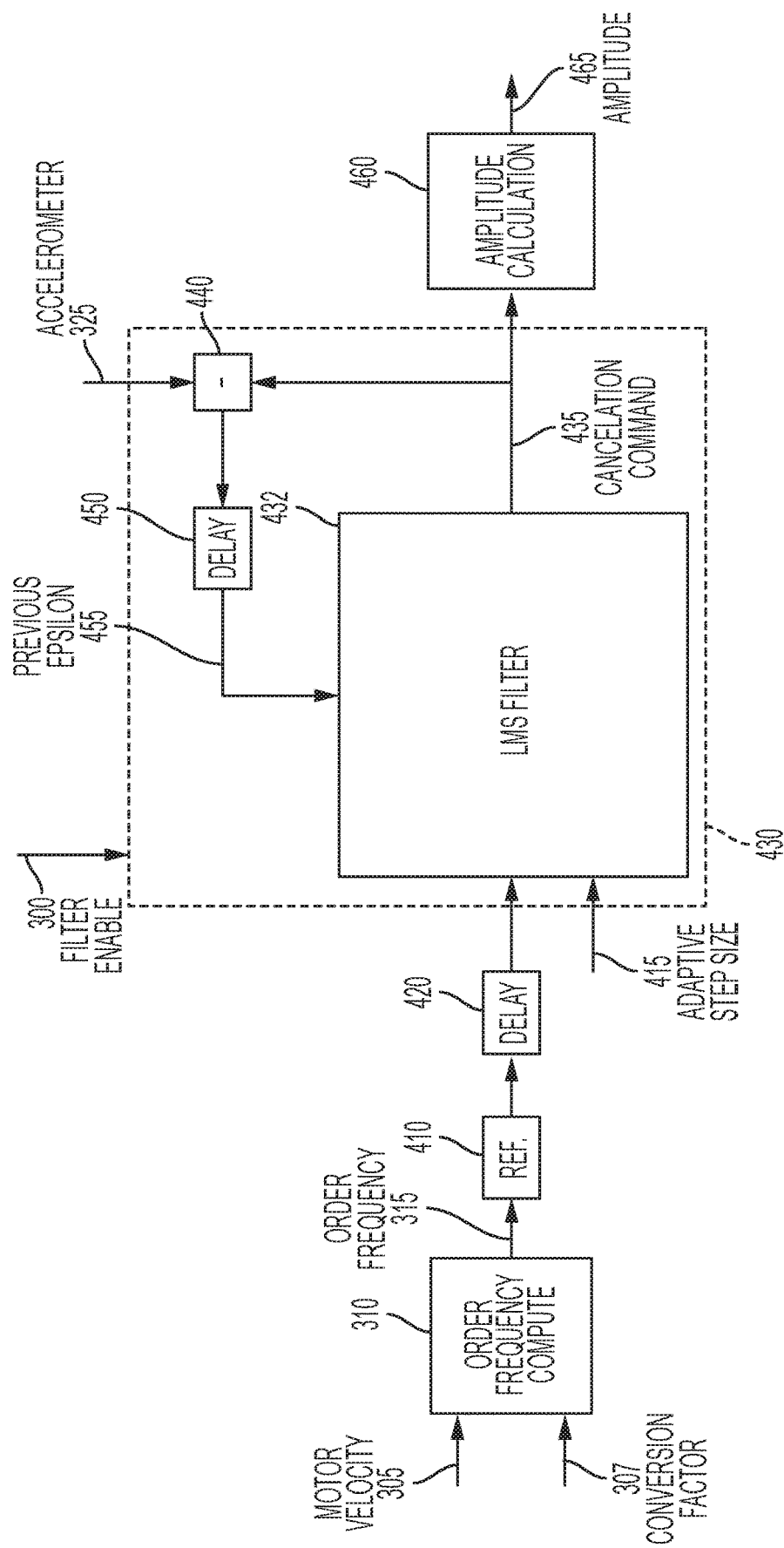
FIG. 5 depicts a block diagram depicting an operational flow for the accelerometer based friction change detector to extract the energy content in the accelerometer signal using a least mean square (LMS) filter according to one or more embodiments.

FIG. 5 depicts a block diagram depicting an operational flow for the accelerometer based friction change detector 210 to extract the energy content in the accelerometer signal using a least mean square (LMS) filter according to one or more embodiments. Typically, LMS based filtering is used in noise cancellation to eliminate noise contained in useful signals. An adaptive filtering system is used herein that is derived from LMS filtering, and is referred to as adaptive line enhancer (ALE) 430. ALE 430 is an adaptive self-tuning filter that separates periodic and stochastic components. The ALE 430 correlates frequency content between a reference signal and the signal of interest. In this case the signal of interest is the accelerometer information and the reference signal is a sinusoidal disturbance signal with frequency corresponding to order frequency.

The ALE 430 also receives as input the order frequency 315 that is computed (310) using the motor velocity. The reference signal generator block 410 outputs a reference signal, which is a sine wave with unity amplitude and frequency corresponding to the order frequency 315. The output of the reference signal generator block 410 is delayed (420) using a predetermined delay prior to sending the order frequency 315 to the ALE 430. The reference signal is thus generated by the reference signal generator 410 in combination with the delay (420) using a sinusoidal generator whose frequency is determined by motor velocity 305 and conversion factor 307. The ALE 430 also receives an adaptive step size 415, which may be a predetermined value or dynamically computed to tune the performance of the ALE 430.

The ALE 430 includes an LMS filtering (432) unit that computes the cancellation command 435 using LMS equations as follows.

$$W(n+1) = W(n) + 2\mu \cdot e(n) \cdot x(n), \text{ where}$$

μ=Adaptive step size which defines the convergence rate
e(n)=Difference between Filter output and Accelerometer signal
x(n)=Reference signal (Output of reference signal generator 410)

Therefore the output of the filter is: $Y(n) = W(n+1) \cdot x(n)$

In the above equations, n represents a time/iteration, where an $n^{th}$ iteration is used during computations during the next, $n+1^{th}$ iteration.

Further, a previous cancellation command 435 that is output by the LMS filtering 432 is subtracted (440) from the accelerometer signal 325, to compute a previous epsilon 455, which is input to the LMS filtering 432. In one or more examples, the previous epsilon 455 is delayed (450) by a predetermined duration prior to inputting the computed difference into the LMS filtering (440). The amplitude 465 of the cancellation command 435 is determined (460) and the resulting amplitude 465 is used for detecting a change in the friction of the ballnut associated with the accelerometer 49 that sends the accelerometer signal 325.

Due to the presence of the order based information in the accelerometer signal 325, the ALE 430 is useful to order track any appropriate frequencies in the accelerometer signal 325. With the use of ALE 430, frequency based information is collected. The cancellation command 435 generated by the ALE 430 estimates the level of cancellation required. The magnitude of cancellation command is a very good representation of the energy present in the accelerometer signal 325 corresponding to the targeted frequency.

Figure 6:
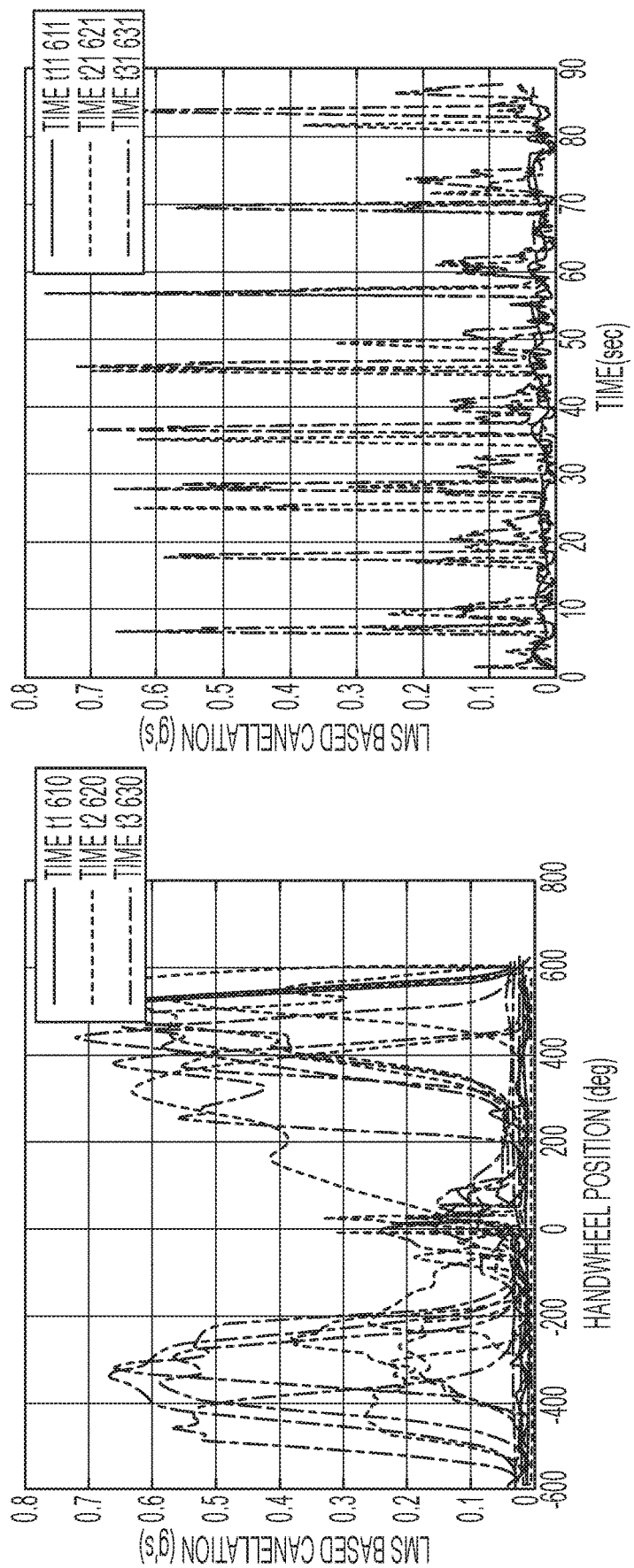
FIG. 6A and FIG. 6B depict graphs that show the cancellation command plotted against handwheel absolute position according to one or more embodiments.

The amplitude 465 of the cancellation command 435 when plotted against absolute handwheel position provides distinguishing information to differentiate between non-friction and friction gear. FIG. 6A and FIG. 6B depict graphs that show the cancellation command 435 plotted against handwheel absolute position with the data being recorded for a constant radius maneuver at a pre-defined vehicle speed over a duration of time. Plot-1 610, plot-2 620, and plot-3 630 depict the data collected at time t1, time t2, and time t3, in that chronological order, respectively. Also, Plot-1 611, plot-2 621, and plot-3 631 depict the data collected at time t11, time t21, and time t31, in that chronological order, respectively. As described earlier, the data depicted herein is during a longitudinal study of a defect of the mechanical component and the data can be collected over days, weeks, months, etc., and in some cases in an accelerated manner if the study so permits. The frequency/period of data collection does not affect the technical solutions described herein. It should be noted that the graphs in FIG. 6A and FIG. 6B are for example scenarios and that the graphs will be different for different examples.

In the above embodiments, the bandpass center frequency, i.e. the half width of the band in the band pass filter 340, and the reference signal frequency in the LMS filtering 432 are chosen such that it does not exceed Nyquist frequency for the given sampling or is not so low that it might overlap with engine firing frequency which in turn is dependent on RPM of the engine (not shown) of the vehicle, normal vehicle road disturbances, etc.

If the bandpass approach is used, appropriate half width of the band and center frequency are chosen, and the detection is disabled when the frequency ranges are not valid for determining a cause of the friction detection. An input signal referred to as filter enable 300 is used to enable/disable the filtering by the bandpass filter 340. In the LMS approach, the filter enable 300 input is used to enable/disable the LMS filtering 430 when the frequency ranges are not valid for detection. In one or more examples, the filter enable 300 is a Binary signal that is turned to zero (or any other value representing OFF) to disable the filtering and is substantially 1 (or any other value representing ON) to enable the filtering.

Figure 7:
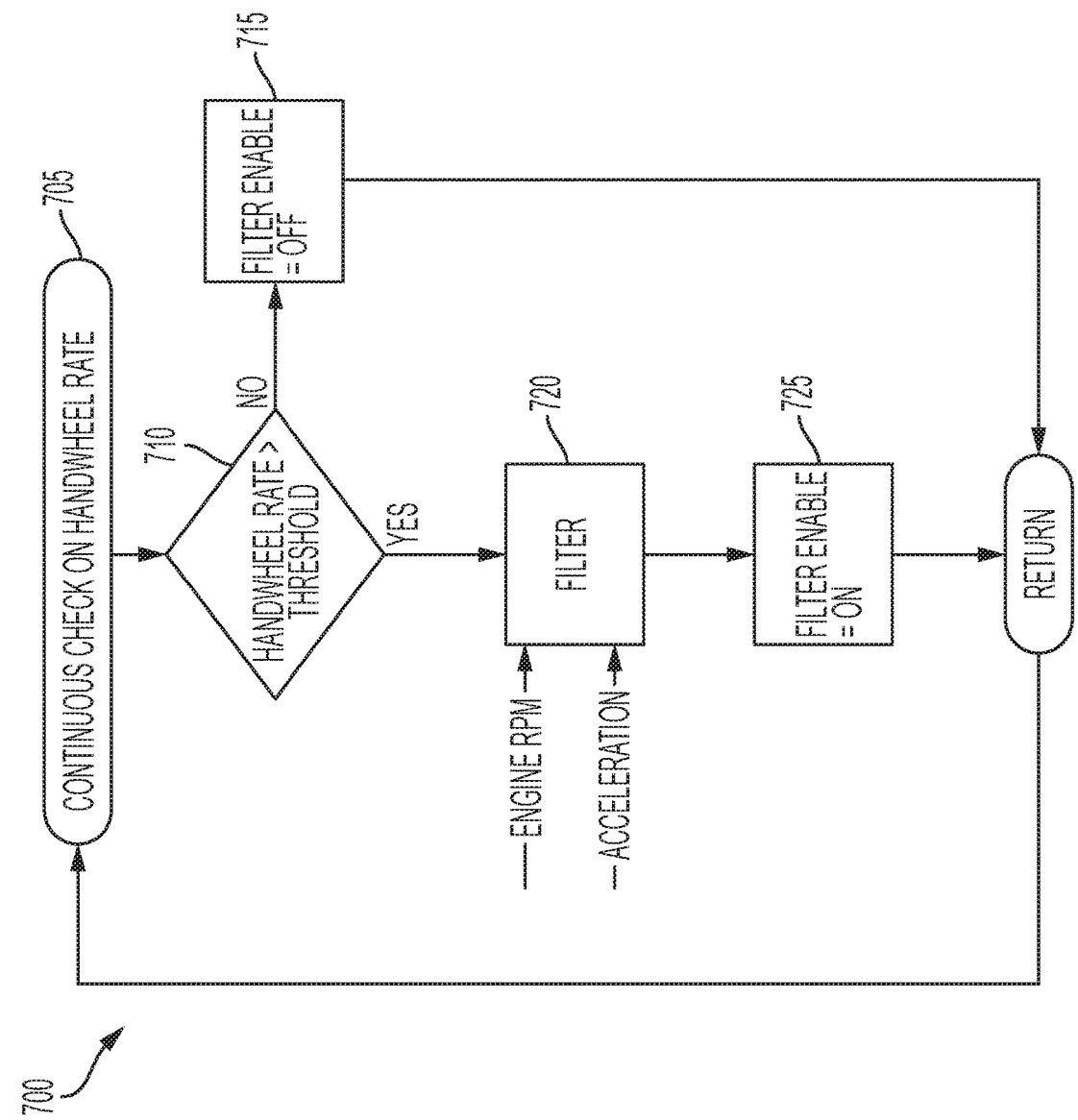
FIG. 7 depicts a flowchart for a method for computing a filter enable input according to one or more embodiments.

FIG. 7 depicts a flowchart for a method 700 for computing the filter enable 300 input according to one or more embodiments. The method 700 includes continuously checking a handwheel rate, at 705. The method 700 includes checking if the handwheel rate, which is a rate at which the handwheel is being maneuvered by a driver, is greater than (or equal to) a predetermined threshold value, at 710. If the condition is not met, the filter enable 300 input is set to disable (for example, 0, OFF), at 715. Alternatively, the method 700 includes ensuring that the handwheel rate is greater than the engine firing frequency, which is a predetermined value, at 720. An adaptive filtering using either the LMS filter or a bandpass filter can be used for this purpose. The filter enable 300 input is subsequently switched to enable (for example, 1, ON), at 725. If the handwheel rate is less than or equal to the engine firing rate, the filter enable 300 input may not be set to enable. The method 700 is repeated continuously so as to continuously update the filter enable 300 value that is input to the friction detection techniques described herein.

The filter enable 300 thus computed is input to the bandpass filter 340 or the ALE 430 depending on which filtering is used to determine increased friction in the ballnut component 47 based on the accelerometer 49. If the filter enable 300 is disabled, the filter (340/430) does not compute the corresponding output, either the bandpassed accelerometer signal 365 or the amplitude 465. If the filter enable 300 is enabled, the corresponding output is computed. In one or more examples, the output from the filter (340/430) is passed through a debouncing operation.

Figure 8:
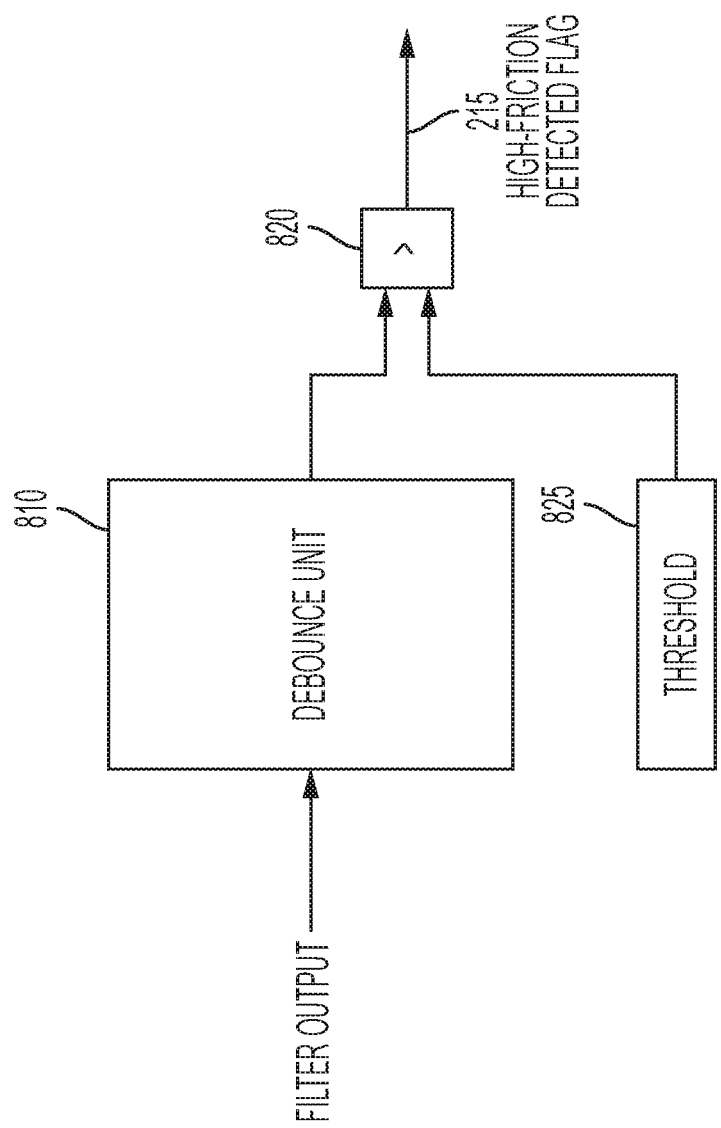
FIG. 8 depicts a block diagram for debouncing an output from the filter module used for the friction estimation according to one or more embodiments.

FIG. 8 depicts a block diagram for debouncing an output from the filter module used for the friction estimation according to one or more embodiments. The debouncing unit 810 receives the bandpassed accelerometer signal 365 from FIG. 3 or the amplitude 465 from FIG. 5. The debouncing unit 810 can debounce the received input using a known debouncing technique, such as P/N debouncing. The debounced output is compared (820) with a predetermined threshold value 825. If the debounced output is greater than (or equal to) the predetermined threshold value, the high-friction detected 215 flag is set to enable (ON, 1). Alternatively, the high-friction detected 215 flag is set to disable (OFF, 0). For example, the bandpassed accelerometer signal or the amplitude is compared with a predetermined threshold (amplitude threshold) which is subsequently debounced using P/N debouncing. Also, the debounced output is compared with a debouncer threshold to set the high-friction detected flag 215 to enable.

The debouncing is implemented to prevent intermittent borderline cases and false detects due to impulses/road disturbances for example, bumps, potholes, etc. The objective function of the debouncing logic is validated against a value threshold and time threshold to appropriately set a fault and notify the driver of high friction.

Using the technical solutions described herein, as friction in the EPS 12, or any other motion control system increases, the accelerometer energy content at targeted frequencies corresponding to ballnut inner/outer race orders and other order based content can be tracked. The technical solutions described herein facilitate ways of implementation to detect a specific order of a mechanical component on accelerometer measurement. In one or more examples, an equivalent EPS signal such as motor torque, handwheel torque, etc. can be used as a measure to track order based frequency content.

The technical solutions described herein can be used with EPS systems 12 using a 2-axis accelerometer 49. In one or more examples, the handwheel effort threshold, which is typically based on vehicle operator specifications is converted into the accelerometer threshold for high friction detection. The technical solutions described herein have built in robustness to minimize falsely detecting friction from non-steering assist mechanism sources, for example because of debouncing logic and the like.

While one or more embodiments of the invention have been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A method for frequency tracking based friction detection, the method comprising:
   receiving, by a moving bandpass filter, an accelerometer signal from an accelerometer coupled with an assist torque system;
   estimating, by the moving bandpass filter, harmonic content in the accelerometer signal based on an order frequency of the assist torque system;
   initiating a friction estimation in the assist torque system in response to the harmonic content that is detected being greater than or equal to a predetermined threshold; and
   adjusting an amount of torque being generated by the assist torque system based on an estimated friction in the assist torque system.

2. The method of claim 1, further comprising, computing an outer race frequency used for a low-pass filter of the moving bandpass filter using the order frequency of the assist torque system.

3. The method of claim 2, wherein the outer race frequency is computed by adding the order frequency and a half bandwidth of the moving bandpass filter.

4. The method of claim 1, further comprising, computing an inner race frequency used for a high pass filter of the moving bandpass filter using the order frequency of the assist torque system.

5. The method of claim 4, wherein the inner race frequency is computed by subtracting a half bandwidth of the moving bandpass filter from the order frequency.

6. The method of claim 1, wherein the moving bandpass filter uses least mean square calculation.

7. The method of claim 6, wherein an amplitude of a filtered output of the adaptive line enhancer filter is compared with the predetermined threshold to determine initiation of the friction estimation.

8. A system comprising:
   a motor;
   an accelerometer coupled to an assist torque system; and
   a motor control system operating the motor and performing a frequency tracking based friction detection using the accelerometer, the friction detection comprising:
       estimating, using a moving bandpass filter, harmonic content in an accelerometer signal from the accelerometer based on an order frequency of the assist torque system;
       initiating a friction estimation in the assist torque system in response to the harmonic content that is detected being greater than or equal to a predetermined threshold; and
       adjusting an amount of torque being generated by the motor based on an estimated friction in the assist torque system.

9. The system of claim 8, wherein an outer race frequency used for a low-pass filter of the moving bandpass filter is computed using the order frequency of the assist torque system.

10. The system of claim 8, wherein an inner race frequency used for a high pass filter of the moving bandpass filter is computed using the order frequency of the assist torque system.

11. The system of claim 8, wherein the moving bandpass filter uses least mean square calculation.

12. The system of claim 11, wherein an amplitude of a filtered output of the adaptive line enhancer filter is compared with the predetermined threshold to determine initiation of the friction estimation.

13. A friction detection system comprising:
   an accelerometer coupled to an assist torque system; and
   a controller coupled with the accelerometer, the controller performing a frequency tracking based friction detection that comprises:
      estimating, using a moving bandpass filter, harmonic content in an accelerometer signal from the accelerometer based on an order frequency of the assist torque system;
      initiating a friction estimation in the assist torque system in response to the harmonic content that is detected being greater than or equal to a predetermined threshold; and
      adjusting an amount of torque being generated by the assist torque system based on an estimated friction in the assist torque system.

14. The friction detection system of claim 13, wherein an outer race frequency used for a low-pass filter of the moving bandpass filter is computed using the order frequency of the assist torque system.

15. The friction detection system of claim 13, wherein an inner race frequency used for a high pass filter of the moving bandpass filter is computed using the order frequency of the assist torque system.

16. The friction detection system of claim 13, wherein the moving bandpass filter uses least mean square calculation.

17. The friction detection system of claim 16, wherein an amplitude of a filtered output of the adaptive line enhancer filter is compared with the predetermined threshold to determine initiation of the friction estimation.

* * * * *